(12) United States Patent
Saida et al.

(10) Patent No.: US 8,981,588 B2
(45) Date of Patent: Mar. 17, 2015

(54) AUXILIARY BICYCLE POWER SUPPLY SYSTEM

(75) Inventors: Takao Saida, Osaka (JP); Taihei Nishihara, Osaka (JP); Yasuo Hosaka, Tokyo (JP); Satoru Shimizu, Tokyo (JP)

(73) Assignee: Shimano Inc., Osaka (JP)

( * ) Notice: Subject to any disclaimer, the term of this patent is extended or adjusted under 35 U.S.C. 154(b) by 777 days.

(21) Appl. No.: 13/157,385

(22) Filed: Jun. 10, 2011

(65) Prior Publication Data

US 2011/0304200 A1    Dec. 15, 2011

(30) Foreign Application Priority Data

Jun. 11, 2010  (JP) ................................. 2010-133828

(51) Int. Cl.
| | |
|---|---|
| B60L 1/00 | (2006.01) |
| B62M 25/08 | (2006.01) |
| B60L 7/16 | (2006.01) |
| B60L 11/00 | (2006.01) |
| B60L 11/18 | (2006.01) |
| B60L 1/14 | (2006.01) |

(52) U.S. Cl.
CPC ............ B62M 25/08 (2013.01); *Y02T 10/7005* (2013.01); B60L 7/16 (2013.01); B60L 11/005 (2013.01); B60L 11/007 (2013.01); B60L 11/1803 (2013.01); B60L 11/1877 (2013.01); *B60L 2200/12* (2013.01); *B60L 2210/10* (2013.01); *B60L 2210/30* (2013.01); *B60L 2220/44* (2013.01); *B60L 2240/36* (2013.01); *B60L 2240/421* (2013.01); *B60L 2250/16* (2013.01); *Y02T 10/705* (2013.01); *Y02T 10/7241* (2013.01); *Y02T 10/7022* (2013.01); *Y02T 10/7216* (2013.01); *Y02T 10/642* (2013.01); B60L 1/14 (2013.01)
USPC ......................................................... 307/9.1

(58) Field of Classification Search
CPC . B60L 11/005; B60L 11/007; B60L 11/1803; B60L 11/1877; B60L 17/16; B62J 99/00; B62M 6/45; B62M 6/65
See application file for complete search history.

(56) References Cited

U.S. PATENT DOCUMENTS

2006/0208659 A1*  9/2006  Okishima ..................... 315/205
2007/0198132 A1*  8/2007  Yamamoto et al. ........... 700/286

(Continued)

FOREIGN PATENT DOCUMENTS

| EP | 1 415 904 A2 | 5/2004 |
|---|---|---|
| EP | 1886913 A2 * | 2/2008 |
| EP | 1 918 186 A1 | 5/2008 |

(Continued)

OTHER PUBLICATIONS

JP 2009220669 A—Machine Translation.*

(Continued)

*Primary Examiner* — Jared Fureman
*Assistant Examiner* — Joel Barnett
(74) *Attorney, Agent, or Firm* — Global IP Counselors

(57) ABSTRACT

An auxiliary bicycle power supply system is provided that basically includes a bicycle power generating portion and an auxiliary power supply portion. The auxiliary power supply portion operates by power from the bicycle power generating portion. The auxiliary power supply portion is configured to supply power generated by the bicycle power generating portion to an electrical bicycle component based on a power supply situation from a main bicycle power supply.

12 Claims, 5 Drawing Sheets

(56) References Cited

U.S. PATENT DOCUMENTS

2007/0252452 A1* 11/2007 Ishimoto et al. ............ 310/67 A
2009/0266636 A1* 10/2009 Naegeli ........................ 180/205

FOREIGN PATENT DOCUMENTS

| FR | 2 870 794 | A1 | | 12/2005 |
|----|-----------|----|----|---------|
| JP | 9-123963 | A | | 5/1997 |
| JP | 2003-335290 | A | | 11/2003 |
| JP | 2005-304283 | A | | 10/2005 |
| JP | 2005304283 | A | * | 10/2005 |
| JP | 2009-220669 | A | | 10/2009 |
| JP | 2009220669 | A | * | 10/2009 |
| JP | 2010-030539 | A | | 2/2010 |

OTHER PUBLICATIONS

JP 2005304283 A—Machine Translation.*
European Search Report of corresponding EP Application No. 11 16 8331.4 dated Jun. 3, 2013.

* cited by examiner

AUXILIARY BICYCLE POWER SUPPLY SYSTEM

CROSS-REFERENCE TO RELATED APPLICATIONS

This application claims priority under 35 U.S.C. §119 to Japanese Patent Application No. 2010-133828, filed Jun. 11, 2010. The entire disclosure of Japanese Patent Application No. 2010-133828 is hereby incorporated herein by reference.

BACKGROUND

1. Field of the Invention

This invention generally relates to an auxiliary bicycle power supply system.

2. Background Information

Among bicycles, assist bicycles are conventionally known in which human-powered drive force is assisted by an electric motor. One such conventional assist bicycle regeneratively controls an electric motor provided on a wheel using a controller (for example, see Japanese Laid-Open Patent Application No. 2005-304283). With such a conventional assist bicycle, a battery is regeneratively charged by supplying power obtained from the electric motor to the battery.

SUMMARY

With a conventional assist bicycle, when a battery runs out, regenerative control by a motor that provides power generating and charging functions can no longer be executed. As a result, there is a possibility that all electric-operated components mounted on the assist bicycle may become unusable.

One object of the present invention is to provide a power supply system capable of stably supplying power to electrical components of a bicycle.

The foregoing object can basically be attained by providing an auxiliary bicycle power supply system according to a first invention includes an auxiliary power supply portion. An auxiliary bicycle power supply system is provided that basically comprises a bicycle power generating portion and an auxiliary power supply portion. The auxiliary power supply portion operates by power from the bicycle power generating portion. The auxiliary power supply portion is configured to supply power generated by the bicycle power generating portion to an electrical bicycle component based on a power supply situation from a main bicycle power supply.

In this auxiliary power supply system, the auxiliary power supply portion is operated by power from a power generating portion provided in the bicycle, and when supply of power to electrical components from a power supply mounted on the bicycle is reduced or suspended, the auxiliary power supply portion supplies power to the electrical components. As shown, in the present first invention, power can be stably supplied to the electrical components of the bicycle depending on a supply situation of power from the power supply mounted on the bicycle. In other words, in the present invention, power can be stably supplied to the electrical components of the bicycle without having to particularly provide other power supplying means.

In accordance with a second aspect of the present disclosure, the auxiliary bicycle power supply system of the first aspect is further configured such that the auxiliary power supply portion is further configured to convert power generated by the power generating portion into a voltage or a current at a prescribed level at which the electrical bicycle component is operable and outputs the voltage or current. In this case, since the auxiliary power supply portion converts power generated by the power generating portion into a voltage or a current at which the electrical components are operable and outputs the voltage or current, the electrical components can be operated regardless of a value of the power outputted from the power generating portion.

In accordance with a third aspect of the present disclosure, the auxiliary bicycle power supply system of the first or second aspect is further configured such that the auxiliary power supply portion includes a rectifying portion that rectifies a voltage from the bicycle power generating portion and a voltage converting portion that transforms the voltage rectified by the rectifying portion into a first voltage. In this case, in the auxiliary power supply portion, since the rectifying portion rectifies a voltage from the power generating portion and the voltage converting portion transforms the rectified voltage into a first voltage, even if a voltage of the power outputted from the power generating portion fluctuates, the voltage can be transformed in a stable state.

In accordance with a fourth aspect of the present disclosure, the auxiliary bicycle power supply system of the third aspect is further configured such that the voltage converting portion sets the first voltage to be equal to or higher than a second voltage at which the bicycle electrical component is operable and lower than a minimum voltage that is output from the main bicycle power supply. In this case, since the first voltage is set equal to or higher than a second voltage that is at which the electrical components are operable and lower than a minimum output voltage from the power supply, when power is being supplied from the power supply mounted to the bicycle, supply of power from the auxiliary power supply portion to the electrical components is regulated while maintaining a voltage at which the electrical components are operable. Accordingly, when power is being supplied from the power supply mounted to the bicycle, the electrical components can be stably operated using the power from the power supply.

In accordance with a fifth aspect of the present disclosure, the auxiliary bicycle power supply system of the third or fourth aspect is further configured such that the auxiliary power supply portion supplies power to the bicycle electrical component at the first voltage upon determining a voltage outputted from the power supply falls below the first voltage. In this case, when the voltage outputted from the power supply falls below the first voltage or, in other words, when the voltage outputted from the power supply falls below the first voltage of the auxiliary power supply portion that is standing by to supply power, power is supplied from the auxiliary power supply portion to the electrical components at the first voltage. Accordingly, when power from the power supply mounted on the bicycle is reduced or suspended, power supplying means can be smoothly switched from the power supply to the auxiliary power supply portion.

In accordance with a sixth aspect of the present disclosure, the auxiliary bicycle power supply system of any one of the first to fifth aspects is further configured such that the bicycle power generating portion includes a motor that is configured to assist in rotation of a bicycle wheel. In this case, since the power generating portion is a motor that assists rotation of a wheel of the bicycle, the auxiliary power supply portion can be operated using the motor that assists rotation of a wheel of the bicycle and without having to particularly provide a power generating portion for operating the auxiliary power supply portion. Accordingly, the auxiliary power supply system can be constructed without significantly changing a configuration of the bicycle.

In accordance with a seventh aspect of the present disclosure, the auxiliary bicycle power supply system of any one of the first to sixth aspects is further provided with a diode having an anode that is electrically connected to the auxiliary power supply portion and a cathode that is electrically connected to the electrical bicycle component. In this case, since the diode is arranged between the auxiliary power supply portion and the electrical components, even if a voltage difference is created between the voltage outputted from the power supply and the voltage outputted from the auxiliary power supply portion, a current outputted from the power supply can be regulated so as not to counterflow into the auxiliary power supply portion. Accordingly, when power from the power supply mounted on the bicycle is reduced or suspended, power can be supplied from the auxiliary power supply portion to the electrical components.

Various objects, features, aspects and advantages of the auxiliary bicycle power supply system will become apparent to those skilled in the art from the following detailed description, which, taken in conjunction with the annexed drawings, discloses two illustrative embodiments of an auxiliary bicycle power supply system.

BRIEF DESCRIPTION OF THE DRAWINGS

Referring now to the attached drawings which form a part of this original disclosure.

DETAILED DESCRIPTION OF EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
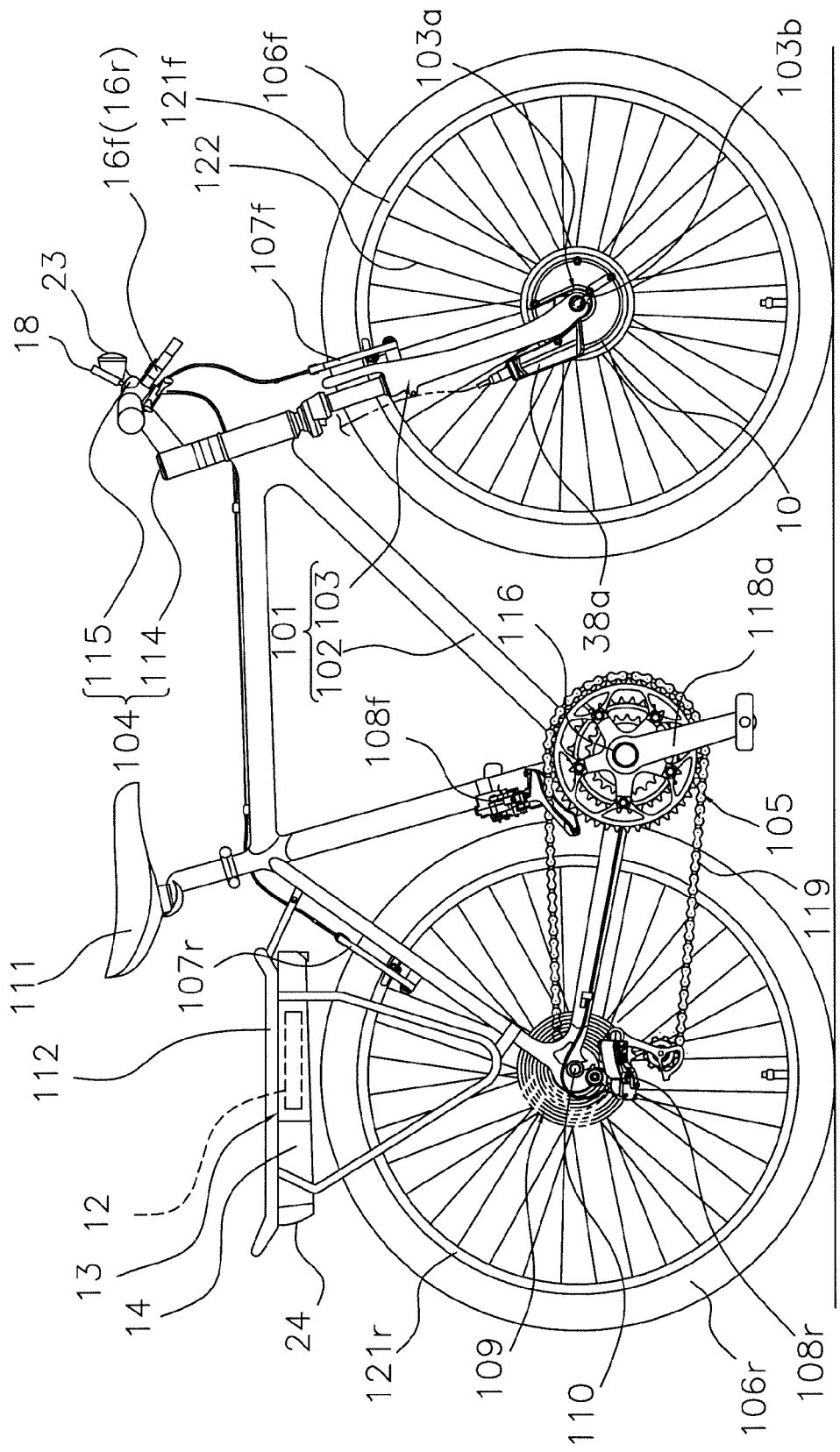
FIG. 1 is a right side view of a bicycle equipped with an auxiliary bicycle power supply system in accordance with one embodiment.

Referring initially to FIG. 1, a bicycle is illustrated which is equipped with a power-assisted bicycle in which human-powered driving is assisted by a motor-integrated hub or motor unit 10 in accordance with one illustrated embodiment. The bicycle is also equipped with an auxiliary bicycle power supply system as explained below. In the following description, the terms "left" and "right" of the bicycle are defined so that when the bicycle is viewed from the rear, the rightward direction is defined as the right, and the leftward direction is defined as the left.

The bicycle includes a frame 101 having a frame body 102 and a front fork 103 with a handle part 104. The bicycle further includes a drive part 105, a front wheel 106f, a rear wheel 106r, a front braking device 107f, a rear braking device 107r, a headlamp 23 and a tail light 24. The front fork 103 is mounted to a front part of the frame body 102 so as to pivot around an inclined axis. The front brake device 107f performs braking by coming into contact with and applying a braking force to a front rim 121f of the front wheel 106f. The rear brake device 107r performs braking by coming into contact with and applying a braking force to a rear rim 121r of the rear wheel 106r.

A variety of parts including a saddle 111 and the handle part 104 are attached to the frame 101. The drive part 105 includes a front derailleur 108f, a rear derailleur 108r and a gear set 109 mounted on a rear hub 110 of the rear wheel 106r. The drive part 105 also includes a crank shaft 116 supported by a hanger part of the frame body 102 in a rotatable manner. The drive part 105 further includes a gear crank 118a and a left crank (not shown) that are secured to both ends of the crank shaft 116. The drive part 105 has a chain 119 provided around the gear crank 118a and the gear set 109.

In the front derailleur 108f, the chain 119 is engaged around one of, e.g., three sprockets mounted on the gear crank 118a. In the rear derailleur 108r, the chain 119 is engaged around one of, e.g., nine sprockets of the gear set 109 attached to the rear hub 110. The front derailleur 108f and the rear derailleur 108r are both electrically driven.

The rear derailleur 108r has an electric shift motor or actuator (not shown), a stage sensor detecting a current shift stage, and a derailleur control portion that controls the electric actuator and the stage sensor. The front derailleur 108f also has an electric shift motor or actuator (not shown), a stage sensor detecting a current shift stage, and a derailleur control portion that controls the electric actuator and the stage sensor. A shift switch that instructs gear shifting is provided on the handlebar 115. The derailleur control portion controls the electric actuator in response to an operation of the shift switch. While the front derailleur 108f and the rear derailleur 108r are to be electrically driven in the present embodiment, the front derailleur 108f and the rear derailleur 108r can alternatively be configured so as to be coupled to shift levers via wires and shift-driven when the wires are pulled by the shift levers.

A rear carrier 112 is mounted to a rear upper part of the frame body 102. A rear carrier unit 13 including an overall control portion 12 that controls electrical components 20 of the entire bicycle is mounted to the rear carrier 112. A power storage portion 14 that acts as a power supply for the electrical components 20 such as the motor-integrated hub 10, the overall control portion 12, and the headlamp 23 (refer to FIG. 3 for the electrical components 20) is detachably mounted on the rear carrier unit 13. The power storage portion 14 includes a storage battery. The storage battery includes, for example, a nickel-hydride battery or a lithium-ion battery. The tail light 24 is integrally mounted to the power storage portion 14.

The handle part 104 has a handle stem 114 fixed to an upper part of the front fork 103 and a bar handle-type handlebar 115 fixed to the handle stem 114. A left brake lever 16f and a right brake lever 16r are mounted on both ends of the handlebar 115. In addition, a display unit 18 and the headlamp 23 are mounted to a central part of the handlebar 115. The display unit 18 is capable of displaying operating modes such as an assist mode and a regenerative brake mode.

Figure 2:
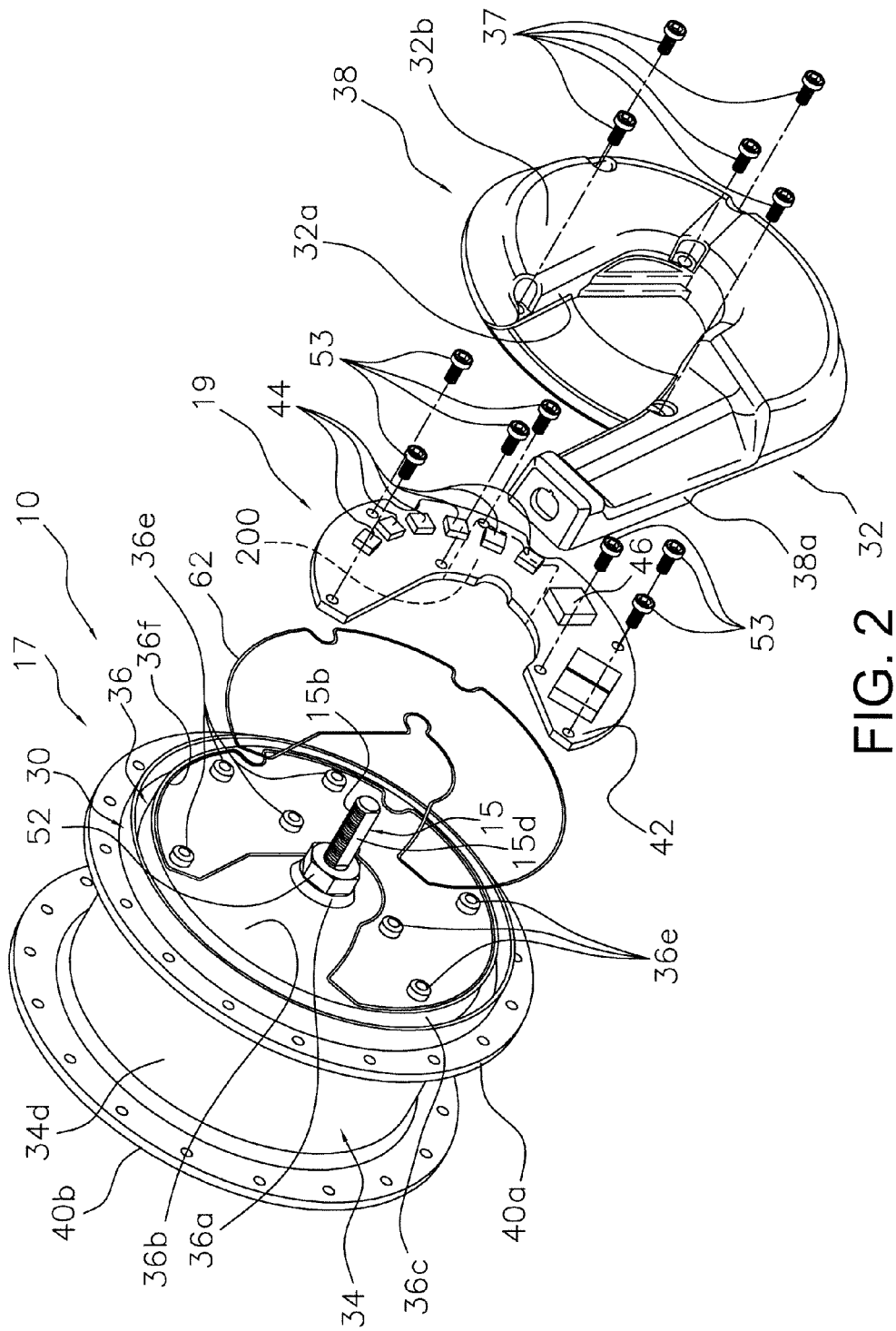
FIG. 2 is an exploded perspective view of a motor-integrated hub.

The motor-integrated hub 10 constitutes a bicycle hub of the front wheel 106f of the bicycle. The motor-integrated hub 10 is mounted to a distal end of the front fork 103 and is for assisting human power. The motor-integrated hub 10 includes, for example, a three-phase brushless DC motor. As shown in FIG. 2, the motor-integrated hub 10 has a hub axle 15, a motor case 17 mounted to the hub axle 15, and an electrical circuit portion 19 arranged inside the motor case 17. In addition, the motor-integrated hub 10 has a motor main body 10a (refer to FIG. 3) not shown in FIG. 2. The motor main body 10a has a rotor rotatably supported by the hub axle 15, a stator fixed to an inner circumferential surface of a first cylindrical portion 36c, to be described later, of the motor case 17 on an outer circumferential side in a radial direction of the rotor, and a rotation transmitting mechanism that transmits rotation of the rotor to a second case member 34, to be described later, of the motor case 17.

The rotor has a magnet (not shown) having, for example, a plurality of magnetic poles in a circumferential direction, and a magnet holding portion that holds the magnet. The magnet holding portion is rotatably supported by the hub axle 15 via two axle bearings arranged at an interval in a hub axle direction. The stator has a plurality of coils (not shown) arranged at intervals in a circumferential direction on the inner circumferential surface of the first cylindrical portion 36c. The plurality of coils are sequentially excited by an alternating current that is switched by a field-effect transistor 44 of the electrical circuit portion 19, and rotates the rotor in a direction of forward movement. The rotation transmitting mechanism transmits rotation of the rotor to the second case member 34 of the motor case 17 and rotates the front wheel 106f in the direction of forward movement. The rotation transmitting mechanism has a planetary gear mechanism (not shown). The planetary gear mechanism decelerates the rotation of the rotor and transmits the same to the second case member 34 of the motor case 17. A mechanical configuration of the motor main body is not limited to the configuration described above. For example, while the configuration described above includes an inner rotor-type motor, an outer rotor-type motor may be used instead. In addition, instead of using a planetary gear mechanism as the rotation transmitting mechanism, a configuration may be adopted in which the rotor is directly connected to the second case member 34.

The hub axle 15 is made of, for example, steel. Both ends of the hub axle 15 are non-rotatably mountable to a front pawl portion 103a on the distal end of the front fork 103. A pair of left and right male screw portions 15b to which nut members for fixing the hub axle 15 to the front fork 103 are to be screwed is formed on outer circumferential surfaces of both ends of the hub axle 15. In addition, a fixing portion 15d having two parallel surfaces is formed on an outer circumferential surface of the male screw portion 15b. The first case member 32, to be described later, of the motor case 17 is non-rotatably coupled to the hub axle 15 at an inward position in the hub axle direction of the fixing portion 15d. A nut member and a locknut (both not shown) are screwed to one male screw portion 15b. A nut member (not shown) and a nut member 52 that fixes the first case member 32 are screwed to the other male screw portion 15b. A turning preventing washer (not shown) which respectively non-rotatably engages the fixing portion 15d and which engages a mounting groove 103b of the front fork 103 to prevent turning of the hub axle 15 is mounted to an inward position on an axial direction of the nut member.

As shown in FIG. 2, the motor case 17 has the first case member 32 that is non-rotatably coupled to the hub axle 15, and the second case member 34 having a first axial end rotatably supported by the first case member 32 and a second axial end rotatably supported by the hub axle 15. The second case member 34 is made of, for example, an aluminum alloy.

The first case member 32 has a recessed portion 32a which is formed on an outside surface and which is capable of receiving the distal end portion of the front fork 103, and a bulging portion 32b which forms the recessed portion 32a and which bulges outward in the hub axle direction. A space for housing the electrical circuit portion 19 is formed inside the bulging portion 32b. The aforementioned motor main body 10a and various mechanisms such as the rotation transmitting mechanism are housed in a space formed by the first case member 32 and the second case member 34.

The first case member 32 has a case main body 36 non-rotatably mounted to the hub axle 15 and a cover member 38 fixed to an outside surface of the case main body 36 by a plurality of (for example, five) mounting bolts 37. The electrical circuit portion 19 is housed between the cover member 38 and the case main body 36. The case main body 36 and the cover member 38 are made of, for example, an aluminum alloy.

The case main body 36 has a first boss portion 36a non-rotatably coupled to the hub axle 15, a first circular plate portion 36b integrally formed with the first boss portion 36a, and a tubular first cylindrical portion 36c that extends from an outer circumferential portion of the first circular plate portion 36b toward the second case member 34. A noncircular coupling hole (not shown) to be non-rotatably coupled to the hub axle 15 is formed on an inner circumferential surface of the first boss portion 36a.

An outside surface of the first circular plate portion 36b is an approximately flat surface. A plurality of mounting bosses 36e formed so as to protrude outward in the direction of the hub axle 15 is formed on the outside surface. A circuit board 42 of the electrical circuit portion 19 is fixed to the mounting bosses 36e by mounting bolts 53. An inner ring (not shown) of, for example, a ball bearing-type first axle bearing 30 that rotatably supports the first end of the second case member 34 is mounted to the outer circumferential surface of the first cylindrical portion 36c.

The cover member 38 has, on an outside surface thereof, the aforementioned recessed portion 32a and the bulging portion 32b. On an inside surface of the cover member 38, a sealing member 62 that suppresses penetration of liquids into the arrangement space of the electrical circuit portion 19 is arranged between the cover member 38 and the case main body 36. The sealing member 62 is formed by rubber or the like which is waterproof and elastic. As shown in FIG. 2, the sealing member 62 is mounted to a sealing groove 36f formed on the outside surface of the first circular plate portion 36b of the case main body 36.

The recessed portion 32a is formed slightly wider than a distal end shape of an ordinary front fork so as to be able to receive front forks of various shapes. The electrical circuit portion 19 fixed to the first circular plate portion 36b is arranged inside the bulging portion 32b. A radiator sheet (not shown) for collectively cooling a plurality of semiconductor elements (in particular, the field-effect transistor 44 to be described later) is mounted on an inside surface of the bulging portion 32b.

A wiring connecting portion 38a is formed on one edge of the recessed portion 32a so as to protrude outward in a circumferential direction of the case main body 36. The wiring connecting portion 38a is formed slightly depressed in the hub axle direction than the bulging portion 32b. The wiring connecting portion 38a is provided in order to extract, to the outside, a duplex electric power line that connects the electrical circuit portion 19 with the overall control portion 12 and the power storage portion 14. As shown in FIG. 1, the wiring connecting portion 38a is formed in proximity to a rear portion of the front fork 103 and is arranged along the front fork 103. Moreover, in the present embodiment, an electric power line 70 (refer to FIG. 3) is configured so as to be capable of performing power supply and signal communication due to PLC (power line communications).

The second case member 34 has a structure similar to a hub shell of an ordinary bicycle hub and is a bottomed tubular member. The second case member 34 is rotatably mounted to the hub axle 15. The second case member 34 has a second boss portion (not shown) rotatably coupled to the hub axle 15 via an axle bearing, a second circular plate portion (not shown) integrally formed with the second boss portion, and a second cylindrical portion 34d tubularly extending inward in the hub axle direction from an outer circumferential portion of the second circular plate portion. The second cylindrical portion 34d is arranged on an outer circumferential side of the first cylindrical portion 36c. An outer ring (not shown) of the first axle bearing 30 is mounted to a first end-side inner circumferential surface of the second cylindrical portion 34d. A first hub flange 40a and a second hub flange 40b for coupling the rim 121f of the front wheel 106f and the motor-integrated hub 10 with each other by spokes 122 are formed at an interval at both ends in the hub axle direction on an outer circumferential surface of the second cylindrical portion 34d.

The electrical circuit portion 19 controls driving of the motor-integrated hub 10 and supplementarily controls power supplied to the electrical components 20. The electrical circuit portion 19 has a function of a DC-AC inverter which switches a direct current supplied from the power storage portion 14 and converts the direct current into an alternating current. In addition, the electrical circuit portion 19 has a function of a rotation sensor that detects at least any of a rotation and a rotational speed of the motor-integrated hub 10 from a frequency of the switching. Furthermore, the electrical circuit portion 19 also has a regenerative driving function for varying a ratio of regenerative braking, in which braking is performed by using the motor-integrated hub 10 as a power generator, by controlling the overall control portion 12 during such regenerative braking. Moreover, the electrical circuit portion 19 also has a dynamo function in which the motor main body 10a (power generating portion) arranged inside the motor-integrated hub 10 is used as a power generator to supply power at which the electrical components 20 are operable to the electrical components 20. In addition, the electrical circuit portion 19 has an electric power line communication portion (not shown) for performing electric power line communication. The electric power line communication portion communicates with the overall control portion 12 that is an electrical component 20 via the electric power line 70 and delivers a command from the overall control portion 12 to the electrical circuit portion 19.

Figure 3:
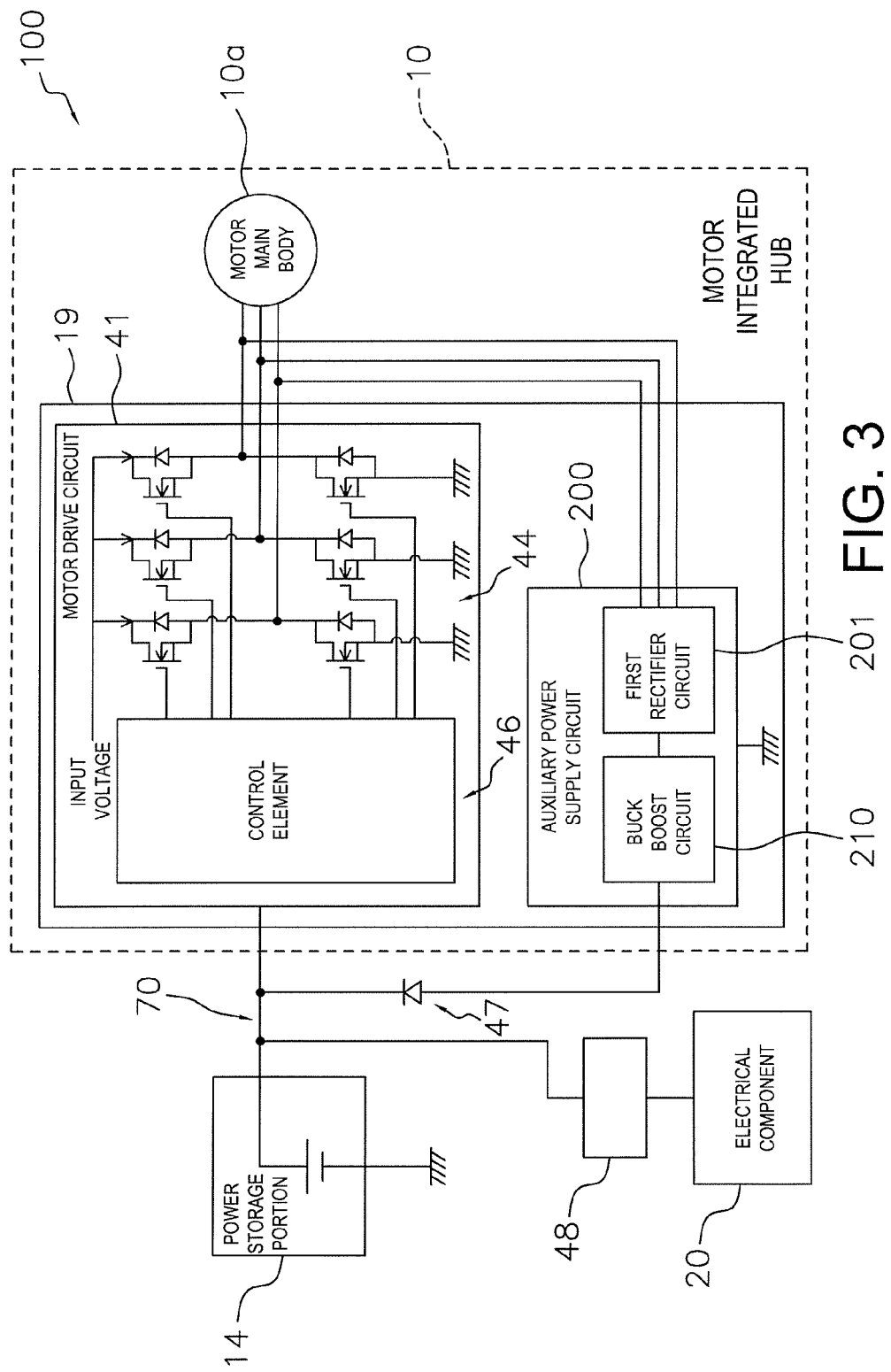
FIG. 3 is a circuit block diagram of a drive circuit of the auxiliary bicycle power supply system.

As shown in FIG. 3, the electrical circuit portion 19 has a motor drive circuit 41 and an auxiliary power supply circuit 200. As shown in FIG. 2, the motor drive circuit 41 has a plurality of (for example, six) field-effect transistors (FETs) 44 mounted to the circuit board 42 fixed to the outside surface of the case main body 36, and other electronic parts including a motor control element 46. A voltage from the electric power line 70 is inputted to the motor drive circuit 41. In addition, as described earlier, the plurality of field-effect transistors 44 are arranged in contact with the radiator sheet. As such, heat mainly generated at the field-effect transistors 44 can be discharged to the outside via the cover member 38.

The auxiliary power supply circuit 200 supplements the control of power to be supplied to the electrical components 20. The auxiliary power supply circuit 200 is mounted to the circuit board 42. For example, the auxiliary power supply circuit 200 is mounted to a rear surface (indicated by a dashed line in FIG. 2) of the circuit board 42 shown in FIG. 2. Details of the auxiliary power supply circuit 200 will be described with reference to the auxiliary power supply system 100 to be described later.

The auxiliary power supply system 100 supplies power to electrical components 20 mountable to the bicycle based on a supply situation of power from a power supply mounted on the bicycle. As shown in FIG. 3, the auxiliary power supply system 100 has the motor main body 10a arranged inside the motor-integrated hub 10, the auxiliary power supply circuit 200 (auxiliary power supply portion) for supplying power to the electrical components 20 when the supply of power from the power supply is suspended, and a first diode 47.

Output of the power storage portion 14 that supplies power necessary for driving the motor main body 10a varies according to power storage states. For example, when fully charged, the power storage portion 14 outputs a maximum voltage. As the amount of charge of the power storage portion 14 decreases, the output voltage decreases from the maximum voltage to a minimum voltage. For example, as the amount of charge of the power storage portion 14 decreases, the output voltage decreases from 24 V (maximum voltage) to 18 V (minimum voltage). Subsequently, when power stored in the power storage portion 14 runs out or the power storage amount drops to or below a predetermined amount, output from the power storage portion 14 is suspended.

As shown in FIG. 3, the motor main body 10a is coupled to the motor drive circuit 41 via wiring such as three power lines for driving and controlling the motor main body 10a. In addition, each of the three power lines that couple the motor main body 10a and the motor drive circuit 41 to each other is coupled to the auxiliary power supply circuit 200.

The auxiliary power supply circuit 200 is operated by power from the motor main body 10a provided in the bicycle. The auxiliary power supply circuit 200 supplies power generated by the motor main body 10a to the electrical components 20 depending on a power output state of the power storage portion 14 mounted on the bicycle. More specifically, the auxiliary power supply circuit 200 converts power generated by the motor main body 10a into a voltage or a current at which the electrical components 20 are operable and outputs the voltage or current.

Figure 4:
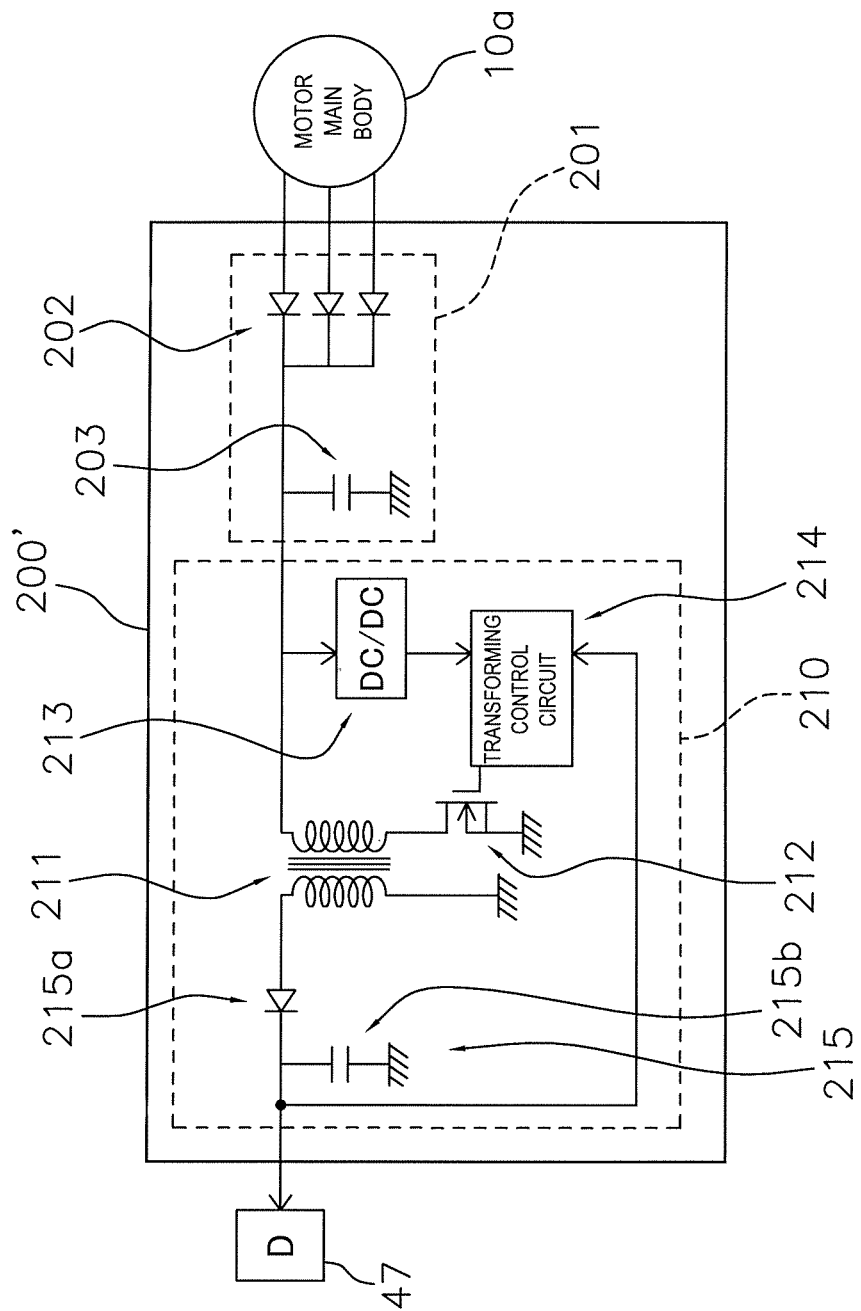
FIG. 4 is a circuit block diagram of an auxiliary power supply circuit of the auxiliary bicycle power supply system.

As shown in FIGS. 3 and 4, the auxiliary power supply circuit 200 has a first rectifier circuit 201 (rectifying portion) that rectifies a voltage from the motor main body 10a and a buck-boost circuit 210 (voltage converting portion) that transforms the rectified voltage.

The first rectifier circuit 201 is a circuit that rectifies and smoothes a voltage from the motor main body 10a. For example, the first rectifier circuit 201 rectifies and smoothes an alternating-current voltage from the motor main body 10a. The first rectifier circuit 201 has a second diode 202 and a capacitor 203. The second diode 202 is connected to each power line and applies half-wave rectification to an alternating-current voltage inputted from each power line. In addition, the voltage subjected to half-wave rectification is inputted to the capacitor 203 to be smoothed by the capacitor 203.

The buck-boost circuit 210 is a circuit for adjusting a direct-current voltage rectified by the first rectifier circuit 201 into a predetermined voltage (first voltage). The buck-boost circuit 210 is operated using a direct-current voltage rectified by the first rectifier circuit 201. The buck-boost circuit 210 has a transformer circuit 211, a first switch circuit 212, a transforming DC-DC converter 213, a transforming control circuit 214, and a second rectifier circuit 215.

The transformer circuit 211 adjusts a direct-current voltage rectified by the first rectifier circuit 201 into a predetermined voltage. The predetermined voltage is set equal to or higher than a voltage at which the electrical components 20 are operable (second voltage) and lower than a minimum output voltage from the power storage portion 14. Here, an example is shown in which the voltage at which the electrical components 20 are operable is 6 V and a minimum output voltage from the power storage portion 14 is 18 V. In addition, the example shows the predetermined voltage set to 10 V.

The first switch circuit 212 is connected to the transformer circuit 211. Due to an on/off operation of the first switch circuit 212, the transformer circuit 211 adjusts a direct-current voltage rectified by the first rectifier circuit 201 into 10 V.

The first switch circuit 212 is arranged between the transformer circuit 211 and the transforming control circuit 214. The first switch circuit 212 is, for example, an FET (field effect transistor). The FET operates as a switch. An on/off state of the first switch circuit 212 is controlled by the transforming control circuit 214. For example, a ratio of input voltage to on/off time (duty ratio) is controlled by the transforming control circuit 214 so as to adjust the output voltage to 10 V.

The second rectifier circuit 215 rectifies and smoothes a voltage outputted from the transformer circuit 211. For example, the second rectifier circuit 215 has a third diode 215a and a capacitor 215b. The third diode 215a rectifies a voltage adjusted by the transformer circuit 211. In addition, this voltage is applied to the capacitor 215b to be smoothed by the capacitor 215b.

The transforming DC-DC converter 213 adjusts a voltage rectified by the first rectifier circuit 201 into a voltage at which the transforming control circuit 214 is operable. Here, the voltage rectified by the first rectifier circuit 201 is adjusted to a predetermined voltage such as 6 V.

The transforming control circuit 214 is activated and operated by a voltage adjusted by the transforming DC-DC converter 213. The transforming control circuit 214 monitors a voltage rectified by the second rectifier circuit 215. In addition, the transforming control circuit 214 controls the first switch circuit 212 so that the voltage rectified by the second rectifier circuit 215 assumes a predetermined voltage such as 10V. Accordingly, a voltage outputted from the buck-boost circuit 210 can be constantly adjusted to a predetermined voltage such as 10 V.

The transforming control circuit 214 is activated and operated by power supplied from the transforming DC-DC converter 213. Therefore, even if supply of power from the power storage portion 14 is suspended, as long as the motor main body 10a is rotating, the transforming control circuit 214 can be activated and operated by power outputted from the motor main body 10a.

Direct-current power adjusted by the buck-boost circuit 210 is supplied to the electrical components 20 via the first diode 47. An anode of the first diode 47 is electrically connected to the auxiliary power supply circuit 200 and a cathode of the first diode 47 is electrically connected to the electrical components 20. More specifically, the anode of the first diode 47 is electrically connected to the auxiliary power supply circuit 200 and the cathode of the first diode 47 is electrically connected to the electrical components 20 via an electrical component DC-DC converter 48.

The first diode 47 prevents a voltage from the power storage portion 14 from being applied to the auxiliary power supply circuit 200 that is also electrically connected to the power storage portion 14. By coupling the first diode 47 to an output of the auxiliary power supply circuit 200 or, in other words, an output of the buck-boost circuit 210, a current from the power storage portion 14 can be regulated so as not to counterflow into the auxiliary power supply circuit even if the voltage outputted from the power storage portion 14 exceeds the first voltage such as 10 V (refer to FIG. 3). In other words, when the voltage outputted from the power storage portion 14 falls under the first voltage such as 10 V, the voltage adjusted to the first voltage at the buck-boost circuit 210 is applied to the electrical components 20 and power is supplied.

As shown in FIG. 3, the electrical component DC-DC converter 48 is arranged between the diode and the electrical components 20. The electrical component DC-DC converter 48 adjusts a voltage outputted from the auxiliary power supply circuit 200 such as a voltage of 10 V (first voltage) to a voltage at which the electrical components 20 are operable such as a voltage of 6 V (second voltage). In addition, the voltage of 6 V adjusted at this point is inputted to the electrical components 20 to activate and operate the electrical components 20.

As shown, in the present embodiment, power can be stably supplied to the electrical components 20 of a bicycle depending on a supply situation of power from the power storage portion 14. Specifically, by using the motor main body 10a arranged inside the motor-integrated hub 10 as a power generator, power outputted from the motor main body 10a can be adjusted by the auxiliary power supply system 100 to a voltage optimal for the electrical components 20. Accordingly, power can be stably supplied to the electrical components 20 without having to rely on the rotation of the motor main body 10a. In addition, power can be stably supplied to the electrical components of the bicycle using only existing equipment and without having to particularly provide other power supplying means.

While a preferred embodiment of auxiliary power supply system has been described above, it is to be understood that the present invention is not limited thereto and that various modifications may be made without departing from the spirit and scope of the invention.

Figure 5:
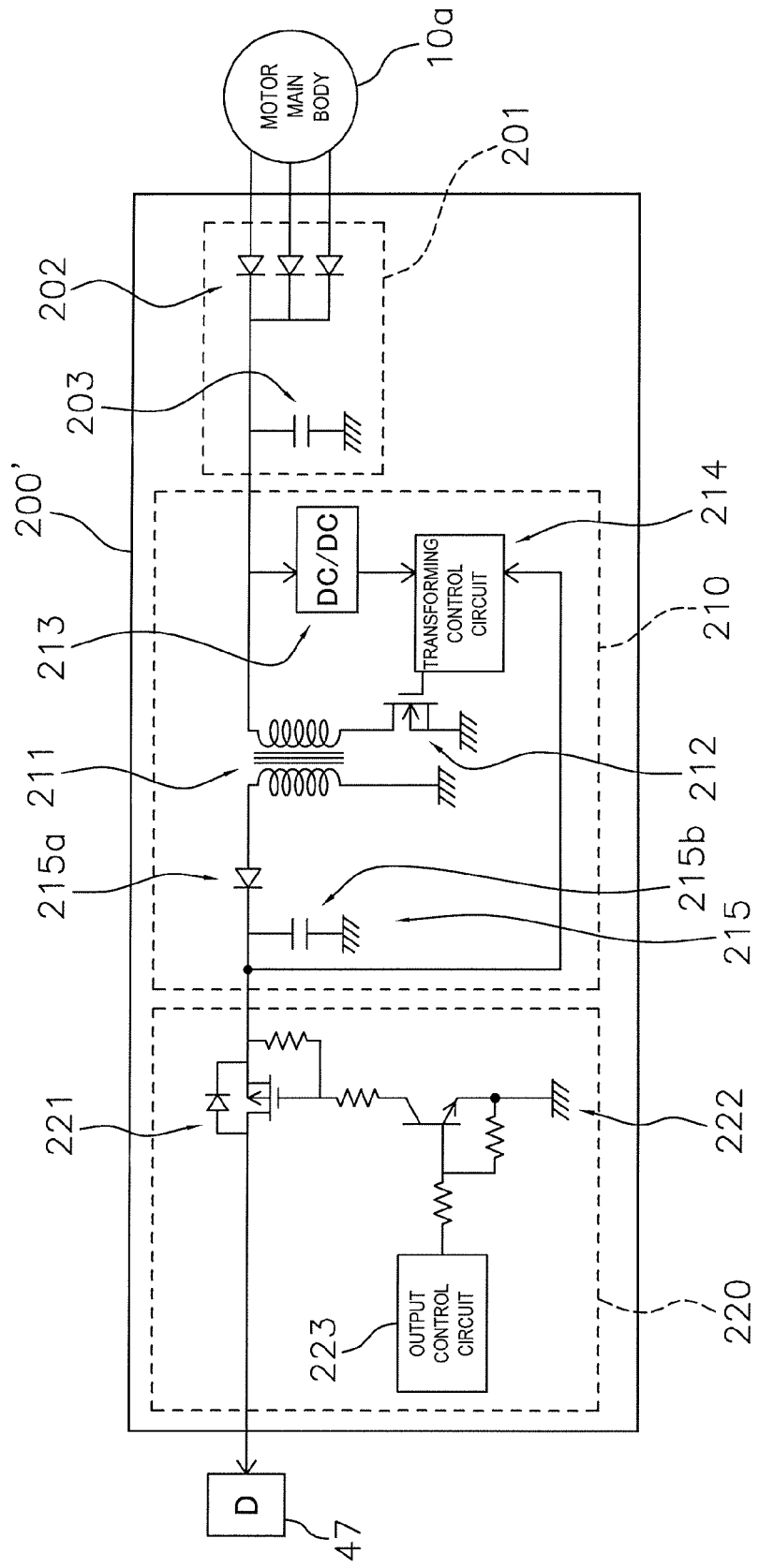
FIG. 5 is a circuit block diagram of an auxiliary power supply circuit in accordance with another embodiment.

While an example of a case where a current is outputted from the buck-boost circuit 210 toward the first diode 47 has been shown in the embodiment described above, a current may alternatively be arranged so as to be outputted from the buck-boost circuit 210 toward the first diode 47 via an output circuit 220. In this case, as shown in FIG. 5, an auxiliary power supply circuit 200' includes the first rectifier circuit 201, the buck-boost circuit 210, and the output circuit 220. Components of the auxiliary power supply circuit 200' are the same as in the embodiment described above with the exception of the output circuit 220. Therefore, a description of the same components as the embodiment described above will be omitted, and a detailed description will be given on the output circuit 220 that is a different component from the embodiment described above. Moreover, like components to the embodiment described above are denoted by like reference numerals.

The output circuit 220 is a circuit that selects whether or not a voltage adjusted at the buck-boost circuit 210 is to be outputted to the electrical components 20. The output circuit 220 includes an output switch circuit 221, a control switch circuit 222 that performs on/off control of the output switch circuit 221, and an output control circuit 223 that controls the control switch circuit 222.

The output switch circuit 221 acts as an output for outputting a voltage adjusted at the buck-boost circuit 210 to the outside from the auxiliary power supply circuit 200'. The output switch circuit 221 is mainly constituted by an FET or the like and operates as a switch. When this switch circuit is switched to an ON state, direct-current power adjusted at the buck-boost circuit 210 is outputted from the auxiliary power supply circuit 200' to the outside.

The control switch circuit 222 is mainly constituted by a transistor or the like. The transistor transmits an on/off signal to the output switch circuit 221 that is an FET or the like. A transmission timing of the on/off signal is controlled by the output control circuit 223.

The output control circuit 223 switches the output switch circuit 221 on/off via the control switch circuit 222. The output control circuit 223 instructs a transmission timing of an on signal to the control switch circuit 222. For example, the output control circuit 223 causes the control switch circuit 222 to output an on signal when the motor main body 10a functions as a power generating portion. Subsequently, the output switch circuit 221 is switched to an ON state based on the on signal, and a current adjusted at the buck-boost circuit 210 is outputted from the auxiliary power supply circuit 200' to the outside.

Accordingly, direct-current power adjusted at the buck-boost circuit 210 is outputted from the auxiliary power supply circuit 200' to the outside. Consequently, the voltage is adjusted to a voltage at which the electrical components 20 are operable such as 6 V (second voltage) by the electrical component DC-DC converter and inputted to the electrical components 20. As a result, the electrical components 20 are activated and operated.

In this case, since the auxiliary power supply circuit 200' has the output circuit 220, a timing at which power outputted from the motor main body 10a is supplied from the auxiliary power supply circuit 200' to the electrical components 20 can be selected. In addition, similar advantageous effects to the embodiment described can be obtained at the same time.

While the overall control portion 12, the headlamp 23, and the like are exemplified as the electrical components 20 in the embodiment described above, the electrical components 20 are not limited to those described earlier. The electrical components 20 are to include all electrical components 20 mountable to a bicycle such as a display device, a bicycle computer, an electric shifting device, a tail light, or the like.

While an example of a case where a voltage at which the electrical components 20 are operable is 6 V, a minimum output voltage from the power storage portion 14 is 18 V, and a voltage after adjustment by the transformer circuit 211 is 10 V has been shown in the embodiment described above, the voltages may be set to any values as long as the voltage after adjustment by the transformer circuit 211 is equal to or higher than the voltage at which the electrical components 20 are operable and lower than the minimum output voltage from the power storage portion 14.

In the embodiment described above, while the auxiliary power supply system 100 functions as long as the motor main body 10a is rotating, when the rotation of the motor main body 10a stops, the auxiliary power supply system 100 stops functioning the moment the power stored in the capacitor 203 or 215 is consumed. Therefore, the auxiliary power supply system 100 may be configured so as to additionally include a power storage portion such as a rechargeable battery. In this case, since power inputted to the auxiliary power supply system 100 during rotation of the motor main body 10a can be stored in the rechargeable battery, even if the rotation of the motor main body 10a stops and power stored in the capacitors 203 and 215 runs out, the electrical components 20 can be operated using the power stored in the rechargeable battery.

The circuit configuration of the auxiliary power supply system 100 is not limited to the configuration described above as long as a predetermined voltage or current can be outputted from the power obtained from the motor main body 10a.

While the auxiliary power supply circuit 200 is provided on the circuit board 42 in the embodiment described above, the auxiliary power supply circuit may alternatively be provided at a portion other than the circuit board 42.

While the assist bicycle is configured so as to have an external shifting device in the embodiment described above, the assist bicycle may alternatively be configured so as to have an internal shifting device or not to include any shifting device. Accordingly, the present system is applicable to any assist bicycle.

Thus, the foregoing descriptions of the embodiments according of bicycle regenerative brake control device are provided for illustration only, and not for the purpose of limiting the invention as defined by the appended claims and their equivalents.

What is claimed is:

1. An auxiliary bicycle power supply system comprising:
a bicycle power generating portion;
a main bicycle power supply configured to supply power to an electrical bicycle component; and
an auxiliary power supply portion which is operated only by power from the bicycle power generating portion, the auxiliary power supply portion being configured to supply power generated by the bicycle power generating portion to the electrical bicycle component when a power level of the main bicycle power supply is below a predetermined power level,
the bicycle power generating portion being configured to be used as an assist motor.

2. The auxiliary bicycle power supply system according to claim 1, wherein
the auxiliary power supply portion is further configured to convert power generated by the power generating portion into a voltage or a current at a prescribed level at which the electrical bicycle component is operable and outputs the voltage or current.

3. The auxiliary bicycle power supply system according to claim 1, wherein
the auxiliary power supply portion includes a rectifying portion that rectifies a voltage from the bicycle power generating portion and a voltage converting portion that transforms the voltage rectified by the rectifying portion into a first voltage.

4. The auxiliary bicycle power supply system according to claim 3, wherein
the voltage converting portion sets the first voltage to be equal to or higher than a second voltage at which the bicycle electrical component is operable and lower than a minimum voltage that is output from the main bicycle power supply.

5. The auxiliary bicycle power supply system according to claim 3, wherein
the auxiliary power supply portion supplies power to the bicycle electrical component at the first voltage upon determining a voltage outputted from the power supply falls below the first voltage.

6. The auxiliary bicycle power supply system according to claim 1, wherein
the bicycle power generating portion includes a motor that is configured to assist in rotation of a bicycle wheel.

7. The auxiliary bicycle power supply system according to claim 1, further comprising
a diode having an anode that is electrically connected to the auxiliary power supply portion and a cathode that is electrically connected to the electrical bicycle component.

8. The auxiliary bicycle power supply system according to claim 2, wherein
the auxiliary power supply portion includes a rectifying portion that rectifies a voltage from the bicycle power generating portion and a voltage converting portion that transforms the voltage rectified by the rectifying portion into a first voltage.

9. The auxiliary bicycle power supply system according to claim 8, wherein
the voltage converting portion sets the first voltage to be equal to or higher than a second voltage at which the bicycle electrical component is operable and lower than a minimum voltage that is output from the main bicycle power supply.

10. The auxiliary bicycle power supply system according to claim 8, wherein
the auxiliary power supply portion supplies power to the bicycle electrical component at the first voltage upon determining a voltage outputted from the power supply falls below the first voltage.

11. The auxiliary bicycle power supply system according to claim 8, wherein
the bicycle power generating portion includes a motor that is configured to assist in rotation of a bicycle wheel.

12. The auxiliary bicycle power supply system according to claim 8, further comprising
a diode having an anode that is electrically connected to the auxiliary power supply portion and a cathode that is electrically connected to the electrical bicycle component.

* * * * *